(12) United States Patent
Ishikawa et al.

(10) Patent No.: US 7,625,123 B2
(45) Date of Patent: Dec. 1, 2009

(54) HYDRODYNAMIC BEARING DEVICE AND SPINDLE MOTOR THAT MAKES USE OF SAME

(75) Inventors: Katsuo Ishikawa, Ehime (JP); Tsutomu Hamada, Osaka (JP)

(73) Assignee: Panasonic Corporation, Osaka (JP)

( * ) Notice: Subject to any disclaimer, the term of this patent is extended or adjusted under 35 U.S.C. 154(b) by 321 days.

(21) Appl. No.: 11/443,014

(22) Filed: May 31, 2006

(65) Prior Publication Data

US 2007/0086686 A1   Apr. 19, 2007

(30) Foreign Application Priority Data

Oct. 14, 2005   (JP) .............................. 2005-299538

(51) Int. Cl.
*F16C 32/06* (2006.01)
*F16C 17/10* (2006.01)

(52) U.S. Cl. ...................... 384/100; 384/107; 384/112; 384/115; 384/123

(58) Field of Classification Search ................. 384/100, 384/107, 112–115, 119, 124, 135, 120, 123, 384/130, 133; 310/90
See application file for complete search history.

(56) References Cited

U.S. PATENT DOCUMENTS

| | | | | |
|---|---|---|---|---|
| 3,602,555 A | * | 8/1971 | Hendler | 384/115 |
| 4,883,367 A | * | 11/1989 | Maruyama | 384/114 |
| 4,961,122 A | * | 10/1990 | Sakai et al. | 360/271.3 |
| 5,181,235 A | * | 1/1993 | Ono et al. | 378/133 |
| 5,427,456 A | * | 6/1995 | Hensel | 384/112 |
| 5,516,212 A | * | 5/1996 | Titcomb | 384/107 |
| 5,647,672 A | * | 7/1997 | Fukutani | 384/100 |
| 5,707,154 A | * | 1/1998 | Ichiyama | 384/107 |
| 5,716,141 A | * | 2/1998 | Chen | 384/100 |
| 6,036,369 A | * | 3/2000 | Ichiyama | 384/119 |
| 6,124,657 A | * | 9/2000 | Yamashita et al. | 310/90 |
| 6,157,515 A | * | 12/2000 | Boutaghou | 384/100 |
| 6,196,722 B1 | * | 3/2001 | Asada et al. | 384/107 |
| 6,250,807 B1 | * | 6/2001 | Mori et al. | 384/100 |
| 6,361,214 B1 | * | 3/2002 | Ichiyama | 384/107 |
| 6,364,532 B1 | * | 4/2002 | Yoshikawa et al. | 384/107 |
| 6,505,970 B2 | * | 1/2003 | Takahashi et al. | 384/123 |

(Continued)

FOREIGN PATENT DOCUMENTS

| | | | | |
|---|---|---|---|---|
| JP | 59017018 A | * | 1/1984 | |
| JP | 63266209 A | * | 11/1988 | |
| JP | 01224518 A | * | 9/1989 | |
| JP | 2534872 | | 5/1997 | |
| JP | 2001-74040 | | 3/2001 | |
| JP | 2001304262 A | * | 11/2001 | |

*Primary Examiner*—Marcus Charles
(74) *Attorney, Agent, or Firm*—Wenderoth, Lind & Ponack, L.L.P.

(57) ABSTRACT

A hydrodynamic bearing device including a sleeve (1), a shaft (2), and oil (100). With respect to the sleeve (1), a stepped portion (1b) provided at one end and an inner peripheral face (1e) extending linearly in the axial direction and continuously with the stepped portion (1b) are formed by a working method that involves the use of a metal mold. The shaft (2) is inserted so as to be capable of relative rotation with respect to the inner peripheral face (1e) of the sleeve (1). The oil fills the space formed between the inner peripheral face of the sleeve and the outer peripheral face of the shaft. Dynamic pressure generation grooves (9a and 9b), which open in the axial direction at at least one end in the axial direction of the inner peripheral face (1e) and are continuous in the axial direction from one end, are formed in the inner peripheral face.

5 Claims, 11 Drawing Sheets

U.S. PATENT DOCUMENTS

| | | | |
|---|---|---|---|
| 6,554,474 B2 * | 4/2003 | Saito et al. | 384/107 |
| 6,608,415 B2 * | 8/2003 | Komura et al. | 384/107 |
| 6,702,408 B1 * | 3/2004 | Nagarathnam et al. | 384/112 |
| 2005/0201645 A1 * | 9/2005 | Asada et al. | 384/100 |

* cited by examiner

Fig. 11B

HYDRODYNAMIC BEARING DEVICE AND SPINDLE MOTOR THAT MAKES USE OF SAME

CROSS-REFERENCE TO RELATED APPLICATIONS

This application claims priority to Japanese Patent Application No. 2005-299538 filed Oct. 14, 2005. The entire disclosure of Japanese Patent Application No. 2005-29953is hereby incorporated herein by reference.

BACKGROUND OF THE INVENTION

1. Field of the Invention

The present invention relates to a hydrodynamic bearing device, and more particularly relates to a hydrodynamic bearing device that is favorable as a bearing device in a hard disk driving device.

2. Background Information

Fluid bearings are used today instead of ball bearings in the spindle motors installed in hard disks. Hard disks equipped with these fluid bearings have been used in the past mainly for desktop computers and notebook computers, but as performance has improved in terms of higher capacity and better resistance to vibration and impact, in recent years these fluid bearings have come to be used in applications other than personal computers in order to meet the needs of the end user, such as video players, music players, video/TV integrated televisions, and other such AV equipment.

There is considerable downward pressure on the price of the hard disks used in these devices. The sample applies to an SPM, which is a component used in hard disks, and the cost needs to be reduced while maintaining good performance in terms of higher capacity and better resistance to vibration and impact.

Each SPM manufacturer has its own approach to achieving the cost reductions demanded by hard disk manufacturers. In particular, reducing the working costs and material costs entailed by an SPM affords a significant reduction in SPM cost.

There is a hydrodynamic bearing device in which a dynamic pressure generation groove is formed in the outer peripheral face of the shaft, and a recess (large diameter component) is provided to the inner peripheral face of the sleeve (see, for example, Japanese Utility Model No. 2,534,872). More specifically, the length of the dynamic pressure generation groove in the axial direction is made longer than the portion other than the recess in the sleeve, that is, the convex portion (small diameter component), so the dynamic pressure generation groove is always across from the convex portion of the sleeve even if the sleeve should shift with respect to the shaft in the axial direction.

With another known hydrodynamic bearing device, two herringbone dynamic pressure generation grooves that are aligned in the axial direction are formed in the inner peripheral face of the sleeve, and an introduction groove that is substantially parallel to the rotational axis is formed at both ends of the herringbone grooves, the result being that there is less imbalance in the axial direction of the dynamic pressure produced in the herringbone dynamic pressure generation grooves (see, for example, Japanese Laid-Open Patent Application 2001-74040). More specifically, any deviation in the inversion timing or manufacturing error in the sleeve is absorbed by the introduction grooves, so there tends to be less axial imbalance in the dynamic pressure if the angled portions of the herringbone grooves are worked for the same amount of time.

With the hydrodynamic bearing device discussed in Japanese Utility Model No. 2,534,872, if the shaft should shift in the axial direction with respect to the sleeve, the lengths of the angled portions of the dynamic pressure generation grooves (the distance from the herringbone peaks to the ends, that is, the effective length of the dynamic pressure grooves) end up being different, so the balance in the generated dynamic pressure is lost, and as a result, flow is generated in the oil in the axial direction, which causes oil leakage or excess lift.

Also, with this bearing structure (in which a recess is provided to the inside diameter portion of the sleeve), forming the sleeve by sinter molding, resin molding, or another such working method involving the use of a metal mold can be employed to reduce material costs and working costs. In general, with a working method involving the use of a metal mold, it is difficult to work a recess in the inside diameter portion of the sleeve because of limitations to the mold structure. Thus, to achieve a balance in the effective lengths of the dynamic pressure generation grooves, it is necessary to add a step in which a recess is cut precisely in the ends and the inside diameter portion of the sleeve, and this drives up the cost.

Let us consider a case in which the forming method is changed in the fluid dynamic bearing structure discussed in Japanese Laid-Open Patent Application 2001-74040 (in which a recess is provided to the inside diameter portion of the sleeve). If the sleeve is formed by a working method involving the use of a metal mold, such as sinter molding or resin molding, in order to reduce material costs and working costs, it is difficult to finish the sleeve in a single step with a working method involving the use of a metal mold. That is, a step of forming a recess in the inside diameter portion is required, and this results in higher cost.

It is an object of the present invention to generate the desired dynamic pressure with an inexpensive configuration.

SUMMARY OF THE INVENTION

The hydrodynamic bearing device in a first embodiment of the present invention comprises a sleeve, a shaft, and a lubricant. A stepped portion provided at one end, and an inner peripheral face extending linearly in the axial direction and continuous to the stepped portion are formed in the sleeve by a working method involving the use of a metal mold. The shaft is inserted so as to be capable of rotation relative to the inner peripheral face of the sleeve. The lubricant fills a space formed between the inner peripheral face of the sleeve and the outer peripheral face of the shaft. A dynamic pressure generation groove that opens in the axial direction at least one end in the axial direction of the inner peripheral face, and is continuous in the axial direction from said one end, is formed in the inner peripheral face.

The phrase "working method involving the use of a metal mold" as used here refers to a working method such as sinter molding, resin molding, or cold forging, for example.

With this device, the bearing hole of the sleeve extends linearly in the axial direction, and no recess or other stepped portion is formed. Therefore, the sleeve can be manufactured with a metal mold, its manufacture is easier, and the cost is lower. There is a particular decrease in material costs and working costs when a working method such as sinter molding, resin molding, or cold forging is used. Also, the dynamic pressure generation groove that opens in the axial direction can be worked by rolling or another such method, so the cost is lower.

With the hydrodynamic bearing device in a second embodiment, an annular groove is formed in the outer peripheral face of the shaft at a location across from said one end, or the other end, or both ends of the inner peripheral face of the sleeve.

For example, when the dynamic pressure generation groove is worked at a location across from the annular groove, the effective length of the dynamic pressure generation groove in the axial direction is determined by the combination of the dynamic pressure generation groove and the recess. Accordingly, even if there is variance in the dimensions of the dynamic pressure generation groove, since the effective length of the dynamic pressure generation groove can be set by the recess, axial imbalance in dynamic pressure is suppressed. Specifically, the desired dynamic pressure can be generated regardless of the working precision of the dynamic pressure generation groove, allowing the dynamic pressure generation groove to be worked by a simpler method, and additionally affording a reduction in working costs.

With the hydrodynamic bearing device in a third embodiment, annular grooves are formed in the outer peripheral face of the shaft, one at a location across from said one end of the inner peripheral face of the sleeve, and the other at a location across from the other end.

With the hydrodynamic bearing device in a fourth embodiment, an annular groove is formed in the outer peripheral face of the shaft at a location across from the approximate middle between said one end and the other end of the inner peripheral face of the sleeve.

With the hydrodynamic bearing device in a fifth embodiment, the dynamic pressure generation groove has a linear groove portion extending linearly in the axial direction from said one end and/or said other end of the inner peripheral face of the sleeve.

For example, with a linear groove portion there is less generation of dynamic pressure, so providing a linear groove portion helps to suppress imbalance in dynamic pressure generation, regardless of the relative positions of the shaft and sleeve in the axial direction.

With the hydrodynamic bearing device in a sixth embodiment, the dynamic pressure generation groove has linear groove portions extending linearly in the axial direction from said one end and said other end of the inner peripheral face of the sleeve.

With the hydrodynamic bearing device in a seventh embodiment, the dynamic pressure generation groove has a pair of dynamic pressure generation components and a middle groove portion formed linearly in the axial direction and connecting the pair of dynamic pressure generation components.

With the hydrodynamic bearing device in a eighth embodiment, the dynamic pressure generation groove has at least one dynamic pressure generation component, and an annular groove is formed in the outer peripheral face of the shaft at a location in the axial direction that does not overlap the dynamic pressure generation center of the dynamic pressure generation component.

With this device, since the annular groove is formed at a location that does not overlap the dynamic pressure generation center, this prevents the annular part from hindering the generation of dynamic pressure by the dynamic pressure generation component.

With the hydrodynamic bearing device in a ninth embodiment, the dynamic pressure generation groove opens in the axial direction at both ends in the axial direction of the inner peripheral face, and is continuous in the axial direction.

With this device, the dynamic pressure generation groove can be worked by rolling or another such method, for example, so the cost is lower.

The spindle motor in a tenth embodiment of the present invention is equipped with the hydrodynamic bearing device in any of the first to ninth embodiments.

This device has the same effects as the hydrodynamic bearing device in any of the first to eighth embodiments.

With the hydrodynamic bearing device pertaining to the present invention, the sleeve is formed by a working method that involves the use of a metal mold, such as sinter molding, resin molding, or cold forging, and the bearing hole of the sleeve extends linearly in the axial direction (there is no relief shape in the center part), the result being that no expensive equipment such as a lathe is required, so the cost is reduced, and the environment is also improved by reducing the amount of cutting debris that is produced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Embodiment 1

A preferred embodiment of the hydrodynamic bearing device of the present invention will now be described through reference to FIG. 1.

Figure 1A:
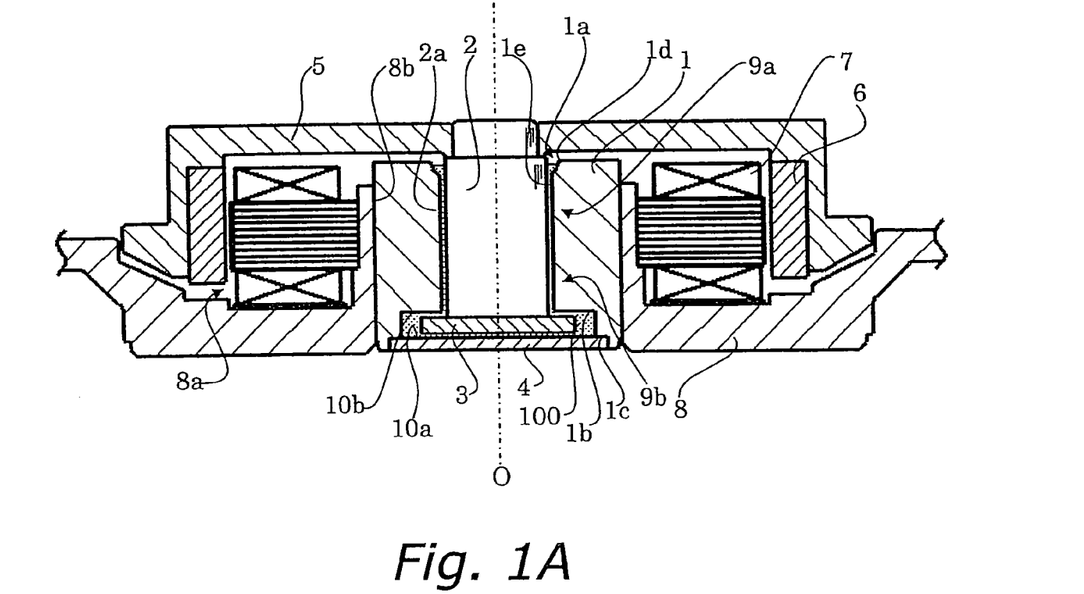
FIG. 1a is a simplified vertical cross section of a spindle motor featuring the hydrodynamic bearing device of Embodiment 1 of the present invention.

FIG. 1a is a cross section of a spindle motor having the fluid hydrodynamic bearing device of Embodiment 1 of the present invention. In FIG. 1a, a sleeve 1 having a bearing hole 1a is formed from a sinter (also called sintered metal) obtained by sintering a metal powder containing one or more of iron, iron alloy, copper, and copper alloy, and is fixed to a base 8. The base 8 has a recess 8a that accommodates a motor component, and a hole 8b for affixing the sleeve 1 is provided in the approximate center of this recess 8a. A stator 7 composed of a core wound with a coil is fixed by adhesive bonding or another such method to the portion of the base 8 where the hole 8b is formed.

A shaft 2 is a member having a cylindrical outer peripheral face 2a (such as a solid or hollow cylindrical member) and made from a metal material that is not a sinter, and is rotatably inserted in the bearing hole 1a. A disk-shaped thrust flange 3 is attached by adhesive bonding, press fitting, crimping, welding, screw fastening, or another such method to the lower end of the shaft 2. A first stepped portion 1b is provided to the sleeve 1, across from the outside diameter portion of the thrust flange 3, and the outside diameter portion of the thrust flange 3 is located with a gap between it and the first stepped portion 1b. A second stepped portion 1c that is larger in diameter than the first stepped portion 1b is provided to the sleeve 1, and a disk-shaped thrust plate 4 is fixed by adhesive bonding, crimping, press fitting, welding, screw fastening, or another such method to the second stepped portion 1c. With this configuration, the thrust flange 3 is accommodated in the space surrounded by the first stepped portion 1b and the thrust plate 4, which is a thrust bearing member. The lower face of the thrust flange 3 is across from the thrust plate 4, and the peripheral part of the upper face is across from the first stepped portion 1b of the sleeve 1.

A rotor hub 5 is roughly bowl-shaped, has a through hole in its approximate center, and the upper end of the shaft 2 is affixed by press fitting, adhesive bonding, welding, or another such method. A rotor magnet 6 of a spindle motor is attached to the rotor hub 5, across from the stator 7 in the radial direction. A magnetic recording disk or the like (not shown) is fixed to the rotor hub 5, and along with the rest of the structure, this constitutes a magnetic recording and reproduction device such as a hard disk driving device.

The rotational center of the shaft 2 and the rotor hub 5 is indicated by the axis line O-O. Hereinafter, the upper side in the drawings will be called the axial upper side, and the lower side in the drawings will be called the axial lower side, but this does not limit the actual attachment state.

Figure 1B:
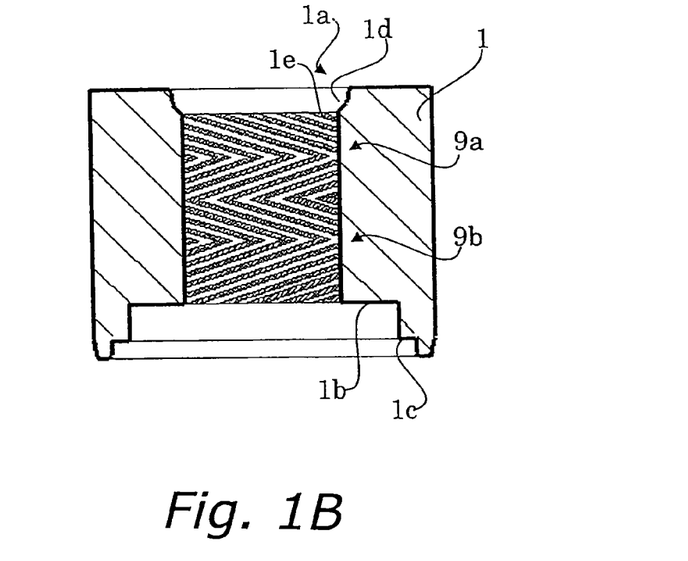
FIG. 1b is a cross section of the sleeve used in the hydrodynamic bearing device.

Next, the hydrodynamic bearing device structure constituted by the sleeve 1 and the shaft 2 will be described in detail through further reference to FIG. 1b.

The face 1e (inner peripheral face) of the bearing hole 1a of the sleeve 1 extends linearly in the axial direction (forming a plane that is parallel to the rotational axis), and no stepped portion or recess is formed therein. Herringbone radial dynamic pressure generation grooves 9a and 9b are formed aligned in the axial direction in the face 1e of the bearing hole 1a, between the stepped portion 1b and an annular angled face 1d. The two dynamic pressure generation grooves 9a and 9b are formed continuous to each other. The dynamic pressure generation grooves 9a and 9b open to the angled face 1d side and the stepped portion 1b side, respectively, and are formed as continuous grooves in the axial direction. Since the sleeve 1 is an iron sinter, it can be manufactured inexpensively by using a metal mold. Furthermore, the surface of the sinter is plated with nickel, for example, to fill in any tiny holes.

The structure of the spindle motor will be described further through reference to FIG. 1a.

A first thrust dynamic pressure generation groove 10a is formed in the face of the thrust plate 4 that is across from the lower face of the thrust flange 3. A second thrust dynamic pressure generation groove 10b is formed in the face of the stepped portion 1b of the sleeve 1 that is across from the upper face of the thrust flange 3. The faces where the thrust dynamic pressure generation grooves are formed are not limited to those mentioned above, and these grooves may be formed in any opposing members that form a gap in the axial direction. Specifically, a thrust dynamic pressure generation groove may be formed in the lower face of the thrust flange 3 or the upper face of the thrust flange 3. An oil 100 is introduced as a lubricant between thrust flange 3 and the thrust plate 4, between the sleeve 1 and the thrust flange 3, and between the bearing hole 1a of the sleeve 1 and the shaft 2, including the dynamic pressure generation grooves 9a and 9b and the dynamic pressure generation grooves 10a and 10b. The angled face 1d is formed at the upper end of the sleeve 1, and a capillary sealing effect prevents the oil 100 from leaking out of the bearing component.

The shaft 2 is also called a rotating shaft, is made of a hard material such as stainless steel, for example, and is worked with a forming tool or the like.

In the past, the inside face of the sleeve was given a textured finish, and it was difficult to create this texture by molding with a metal mold, so expensive working equipment such as a lathe was necessary in a subsequent step. With an embodiment pertaining to the present invention, however, no step is formed in the portions of the sleeve 1 between the angled face 1d and the stepped portions 1b and 1c, which means that molding with a metal mold is possible, the desired finish on the inner face can be produced with inexpensive equipment such as a reamer, and this affords a reduction in cost.

The production of the fluid hydrodynamic bearing device of Embodiment 1 will be described through reference to FIG. 1a. When power is sent to the stator 7, a rotational magnetic field is generated in the rotor magnet 6, and the shaft 2 and thrust flange 3 rotate integrally with the rotor hub 5. Pumping pressure, which is known in this field of technology, is generated in the oil 100 by the dynamic pressure generation grooves 9a and 9b and the dynamic pressure generation grooves 10a and 10b, and the shaft 2 and thrust flange 3 rotate without coming into contact with the sleeve 1 or the thrust plate 4. Specifically, a radial bearing that supports the shaft 2 in non-contact with the bearing hole 1a in the radial direction is formed by the dynamic pressure generation grooves 9a and 9b, and a thrust bearing that supports the thrust flange 3 in non-contact with the sleeve 1 and the thrust plate 4 in the thrust direction is formed by the dynamic pressure generation grooves 10a and 10b.

The typical manufacturing steps for making the sleeve 1 from a sintered metal material will be described. First, a metal powder is readied. The iron, iron alloy, copper, copper alloy, or other metal powder that serves as the sintered metal material usually has a particle size of about 0.03 to 0.5 mm, and is usually the above-mentioned iron, iron alloy, copper, or copper alloy, either singly or in mixtures of two or more of these. A lubricant is added and uniformly mixed into the metal powder. The lubricant acts as a release agent when the metal powder is molded. The mixed material is placed in a metal mold made in the shape of a sleeve, and is compressed at a specific molding pressure in a press or the like, which creates a molded article in the shape of a sleeve.

Next, the molded article is sintered by being heated to a specific temperature. This heating expands the contact area between the metal powder particles, resulting in face contact, so the molded article shrinks and its volume is reduced. As a result, the density of the sinter increases, as does its strength. Shrinkage that occurs in the course of sintering often leads to a decrease in component precision, so the size is increased somewhat ahead of time, and the sleeve 1 is completed by performing mechanical working as necessary to bring the dimensions down to the desired level.

Thus, with the fluid hydrodynamic bearing device of Embodiment 1 of the present invention, since the sleeve 1 is formed from a sintered metal, the cost is lower and productivity is higher.

The dynamic pressure generation grooves 9a and 9b are formed by separate rolling steps. More specifically, the dynamic pressure generation grooves 9a and 9b are formed with a groove working tool in the inner peripheral face 1e of the bearing hole 1a. The groove working tool has a holder that holds a plurality of rolling balls on the outer peripheral face, and this holder is attached to the tip of the tool. The groove working tool is rotated while being pushed into the inner face of the sleeve 1, which forms the dynamic pressure generation grooves 9a and 9b continuously. The dynamic pressure generation grooves 9a and 9b formed by this rolling step open to the angled face 1d side and the stepped portion 1b side, respectively. For example, in the rolling step, the rolling is performed in one axial direction to form a groove in that axial direction, the tip of the groove working tool is pushed through in the other axial direction, and then rolling is performed in that other axial direction to form a groove in that axial direction. A working step such as this shortens the working time, and also allows a dynamic pressure generation groove to be formed easily.

A single dynamic pressure generation groove may also be formed, for example, by performing rolling in one axial direction to form a groove, and moving the groove working tool in the opposite direction from the first axial direction, along the groove that has been formed, without pushing through the tip of the working tool in the other axial direction. In this case, the dynamic pressure generation groove opens in the axial direction only on the side where rolling is commenced. Also, when a dynamic pressure generation groove 9a is formed from one side, and the dynamic pressure generation groove 9b is formed from the other side, there may be a middle portion in which no groove is formed between the dynamic pressure generation groove 9a and the dynamic pressure generation groove 9b.

With the device described above, the bearing hole 1a of the sleeve 1 extends linearly in the axial direction, and no recess or other stepped portion is formed. Therefore, the sleeve 1 is easier and less expensive to manufacture.

Also, the dynamic pressure generation grooves 9a and 9b can be formed by rolling, which means that working is simpler. Further, when the dynamic pressure generation grooves 9a and 9b are formed continuously in the axial direction, the working time can be shortened.

Shaft Modifications

The shaft used in the spindle motor is not limited to the one described above, and may instead be the following.

(1)

Figure 2:
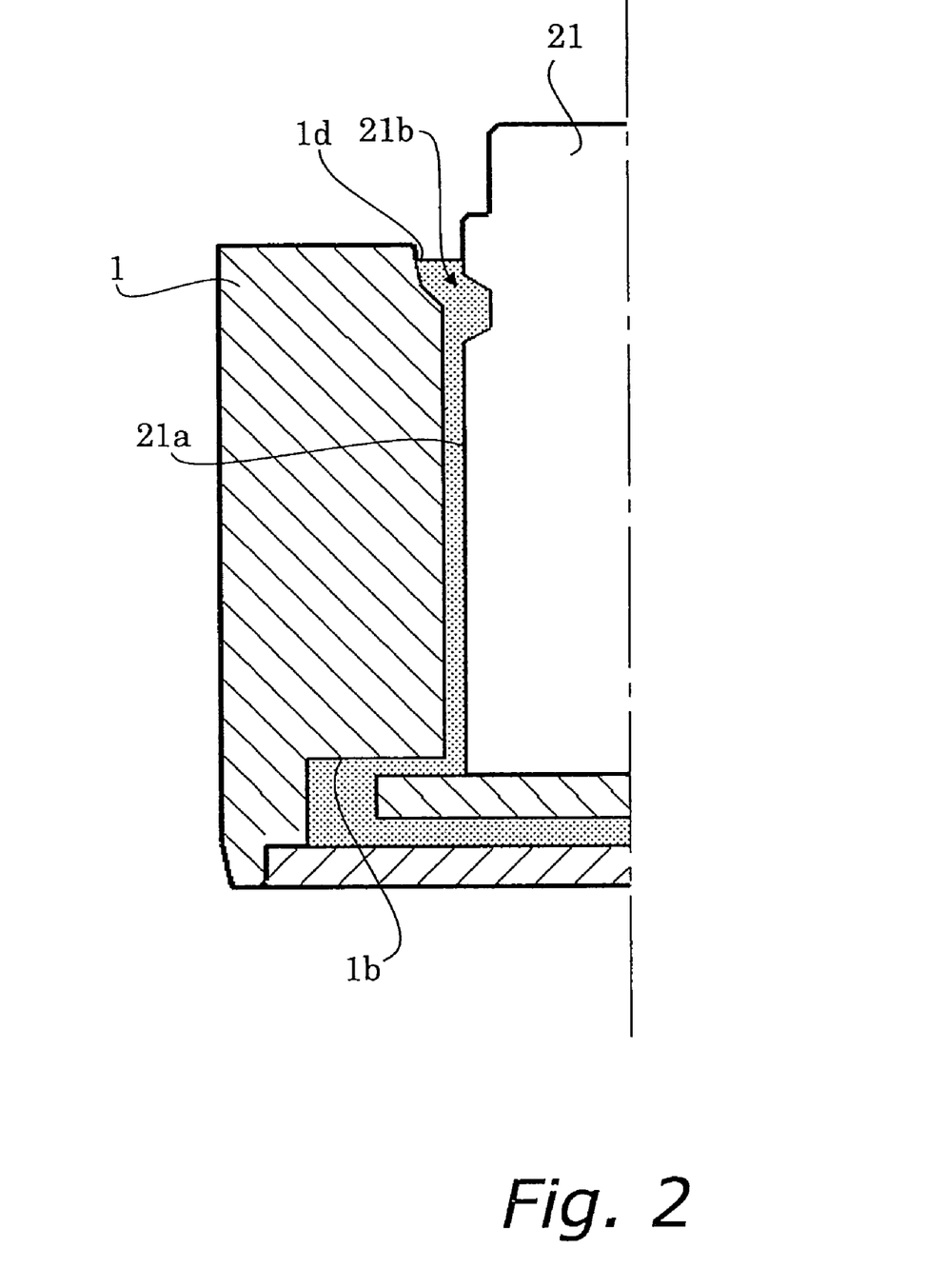
FIG. 2 is a cross section of the structure of the shaft in a modification.

As shown in FIG. 2, an annular recess 21b is formed in the outer peripheral face 21a of a shaft 21, which is a modification example of the shaft 2. The annular recess 21b is formed at a location that is across from the angled face 1d side of the sleeve 1 in the axial direction, and a location that does not overlap the dynamic pressure generation center of the dynamic pressure generation groove 9a (the axial location of the peak of the herringbone pattern). More specifically, it is formed at a location across from the outside of the dynamic pressure generation groove 9a in the axial direction. This prevents the recess 21b from hindering the generation of dynamic pressure. Also, when the shaft 21 is formed from stainless steel or the like, if the recess 21b is made with a forming tool or the like, the shaft can be manufactured at the same cost as the shaft 2 with no texturing (see FIG. 1a).

With a hydrodynamic bearing device in which the shaft 21 is used, the outer peripheral face 21a other than the recess 21b becomes the effective portion of the radial dynamic pressure bearing. Accordingly, the effective length of the dynamic pressure generation grooves 9a and 9b, and particularly that of the dynamic pressure generation groove 9a, is set by the axial width of the recess 21b. The recess shape may also consist of angled faces.

When combined with the shaft 21, the dynamic pressure generation grooves 9a and 9b are formed longer in the axial direction than what is needed for dynamic pressure generation, and the recess 21b is across from the dynamic pressure generation groove 9a in the radial direction, which determines the effective length of the dynamic pressure generation groove 9a in the axial direction. Therefore, even if there should be variance in the dimensions of the dynamic pressure generation groove 9a, the effective length of the dynamic pressure generation groove 9a can be set by the recess 21b, so there is less dynamic pressure imbalance in the axial direction.

(2)

Figure 3:
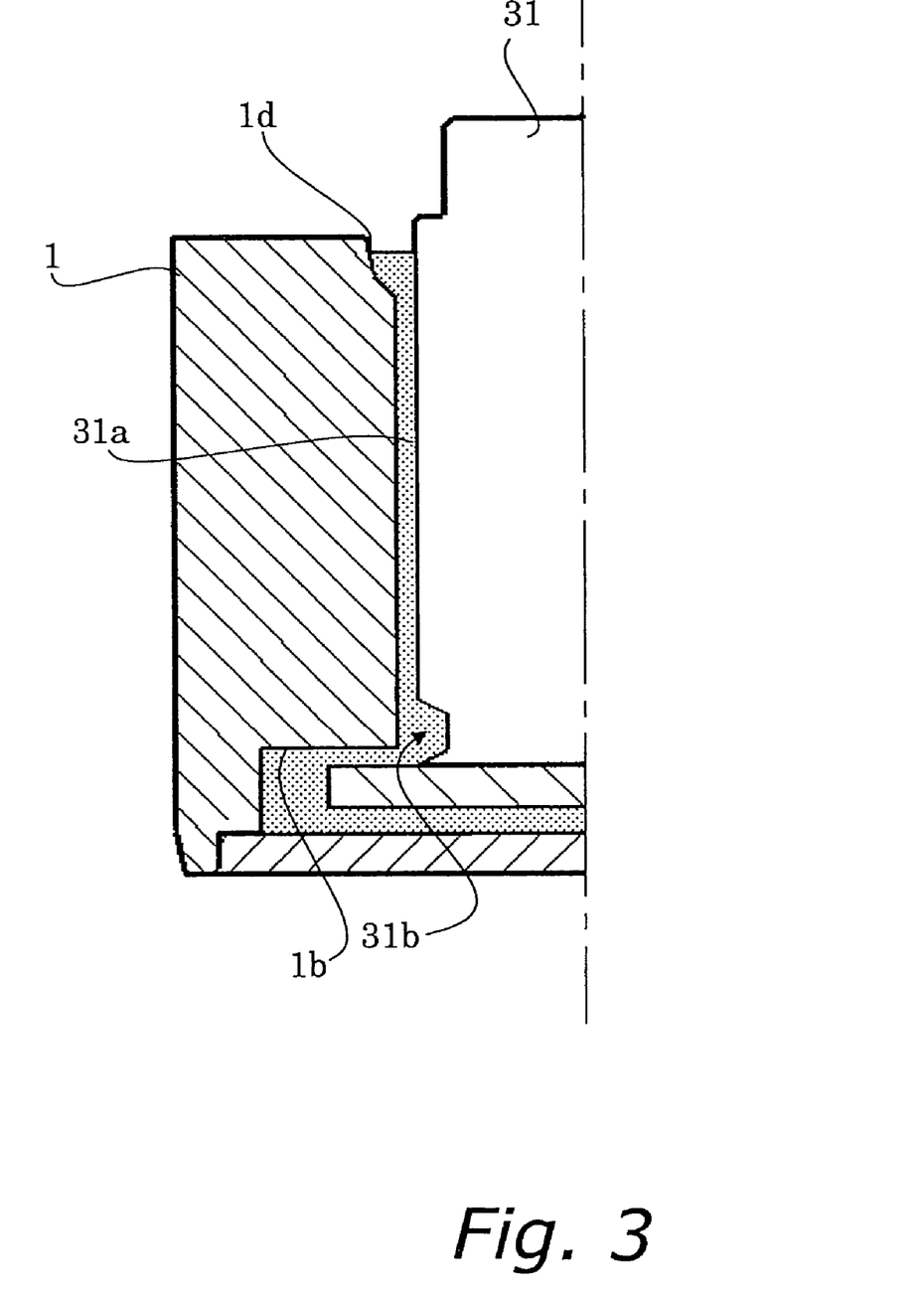
FIG. 3 is a cross section of the structure of the shaft in a modification.

As shown in FIG. 3, an annular recess 31b is formed in the outer peripheral face 31a of a shaft 31, which is a modification example of the shaft 2. The annular recess 31b is formed at a location that is across from the stepped portion 1b side of the sleeve 1 in the axial direction, and a location that does not overlap the dynamic pressure generation center of the dynamic pressure generation groove 9b (the axial location of the peak of the herringbone pattern). More specifically, it is formed at a location across from the outside of the dynamic pressure generation groove 9b in the axial direction. This prevents the recess 31b from hindering the generation of dynamic pressure. Also, when the shaft 31 is formed from stainless steel or the like, if the recess 31b is made with a forming tool or the like, the shaft can be manufactured at the same cost as the shaft 2 with no texturing (see FIG. 1a).

With a hydrodynamic bearing device in which the shaft 31 is used, the outer peripheral face 31a other than the recess 31b becomes the effective portion of the radial dynamic pressure bearing. Accordingly, the effective length of the dynamic pressure generation grooves 9a and 9b, and particularly that of the dynamic pressure generation groove 9a, is set by the axial width of the recess 31b. The recess shape may also consist of angled faces.

When combined with the shaft 31, the dynamic pressure generation grooves 9a and 9b are formed longer in the axial direction than what is needed for dynamic pressure generation, and the recess 31b is across from the dynamic pressure generation groove 9b in the radial direction, which determines the effective length of the dynamic pressure generation groove 9b in the axial direction. Therefore, even if there should be variance in the dimensions of the dynamic pressure generation groove 9b, the effective length of the dynamic pressure generation groove 9b can be set by the recess 31b, so there is less dynamic pressure imbalance in the axial direction.

(3)

Figure 4:
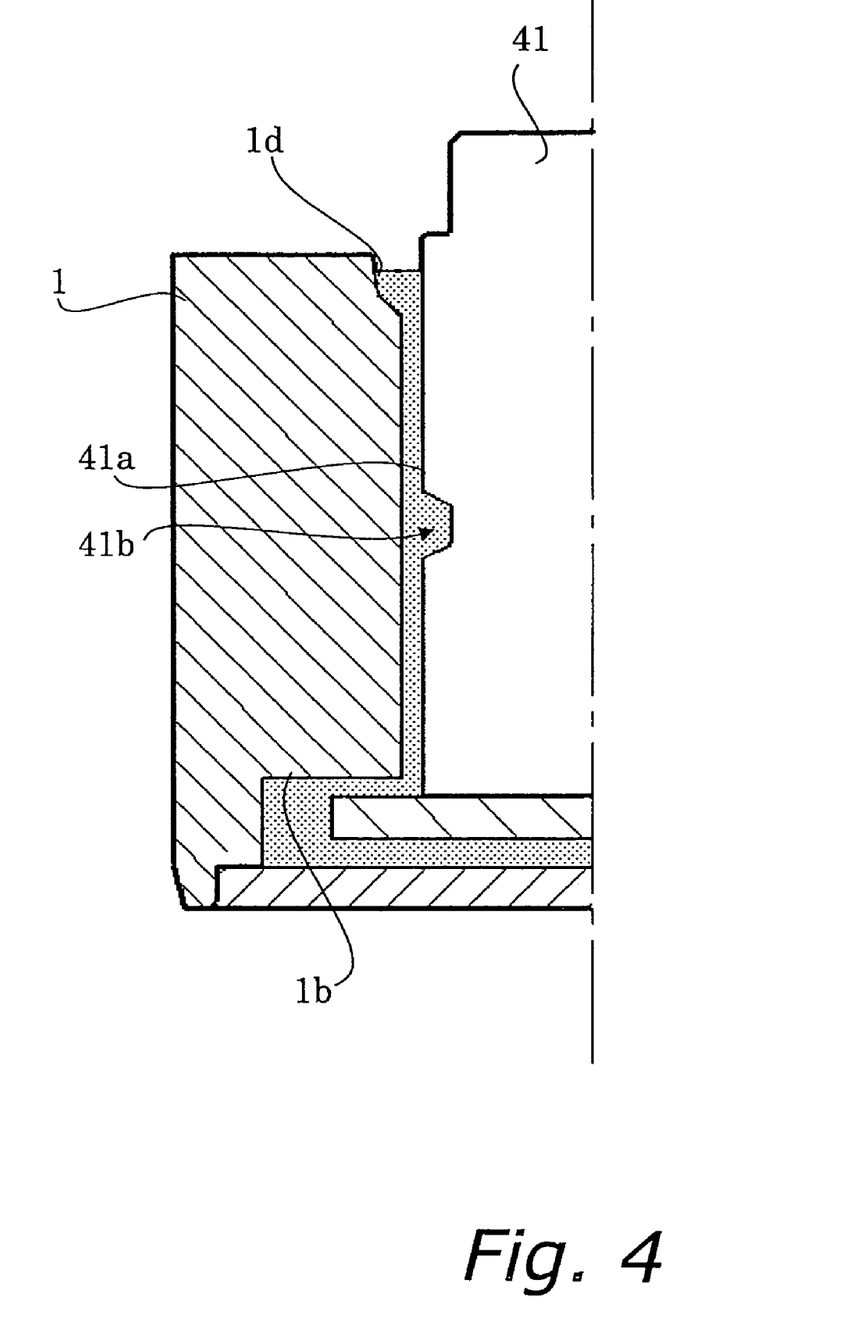
FIG. 4 is a cross section of the structure of the shaft in a modification.

As shown in FIG. 4, an annular recess 41b is formed in the outer peripheral face 41a of a shaft 41, which is a modification example of the shaft 2. The annular recess 41b is formed at locations that are across from the approximate middle in the axial direction of the angled face 1d and the stepped portion 1b of the sleeve 1, and locations that do not overlap the dynamic pressure generation center of the dynamic pressure generation grooves 9a and 9b (the axial location of the peak of the herringbone pattern). More specifically, it is formed at locations across from the inside of the dynamic pressure generation grooves 9a and 9b in the axial direction. This prevents the recess 41b from hindering the generation of dynamic pressure. Also, when the shaft 41 is formed from stainless steel or the like, if the recess 41b is made with a forming tool or the like, the shaft can be manufactured at the same cost as the shaft 2 with no texturing (see FIG. 1a).

With a hydrodynamic bearing device in which the shaft 41 is used, the outer peripheral face 41a other than the recess 41b becomes the effective portion of the radial dynamic pressure bearing. Accordingly, the effective length of the dynamic pressure generation grooves 9a and 9b is set by the axial width of the recess 41b. The recess shape may also consist of angled faces.

When combined with the shaft 41, the dynamic pressure generation grooves 9a and 9b are formed longer in the axial direction than what is needed for dynamic pressure generation, and the recess 41b is across from the dynamic pressure generation grooves 9a and 9b in the radial direction, which determines the effective length of the dynamic pressure generation grooves 9a and 9b in the axial direction. Therefore, even if there should be variance in the dimensions of the dynamic pressure generation grooves 9a and 9b, the effective length of the dynamic pressure generation grooves 9a and 9b can be set by the recess 41b, so there is less dynamic pressure imbalance in the axial direction.

(4)

As shown in FIGS. 5 to 8, a plurality of recesses the same as the recesses 21b, 31b, and 41b discussed above may be formed in the shaft in a modification example of the shaft 2.

Figure 5:
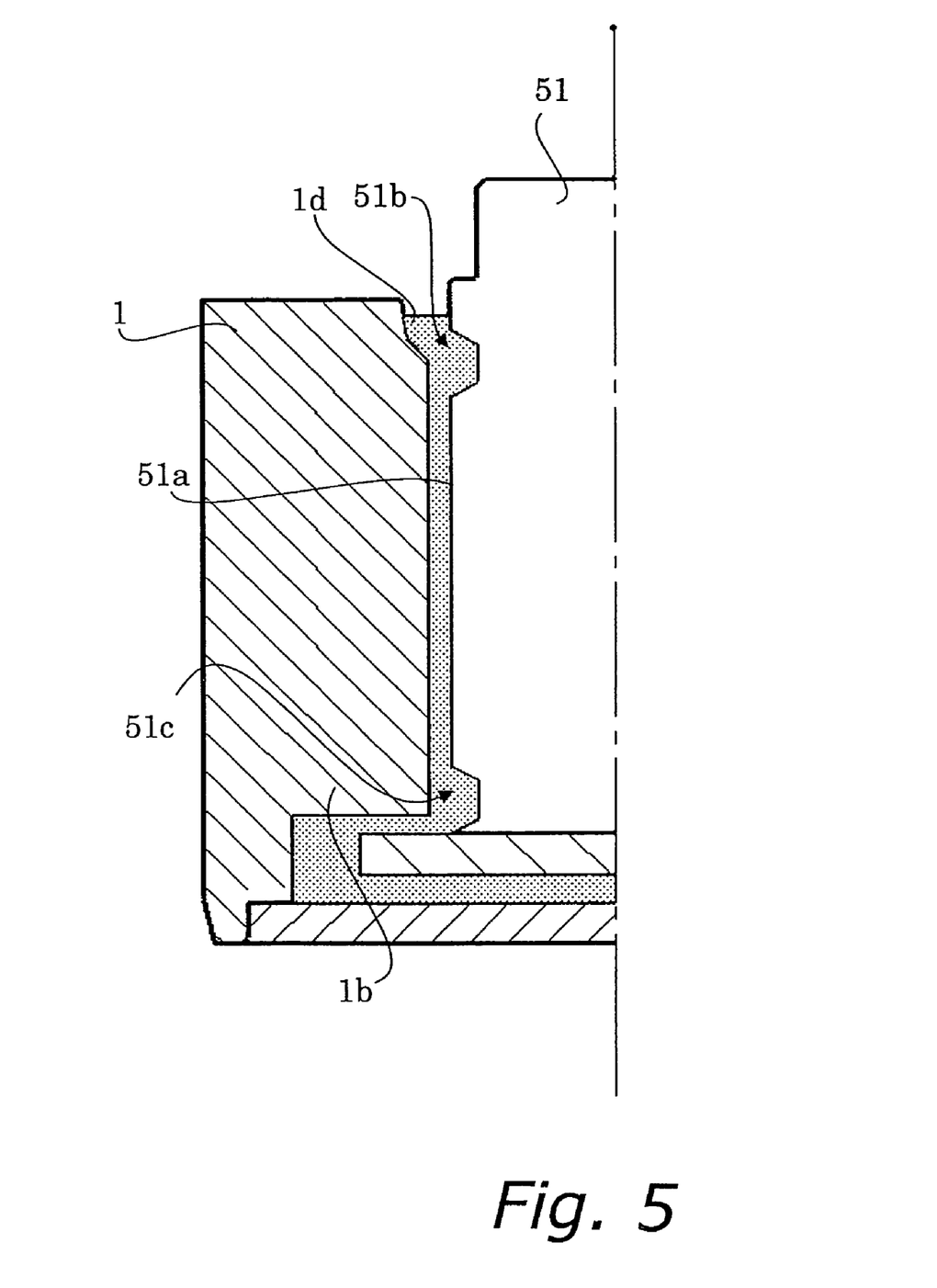
FIG. 5 is a cross section of the structure of the shaft in a modification.

With the shaft 51 shown in FIG. 5, two recesses are formed at two places aligned in the axial direction. More specifically, a recess 51b and a recess 51c are formed at locations corresponding to the recess 21b and the recess 31b, respectively, in the outer peripheral face 51a.

Figure 6:
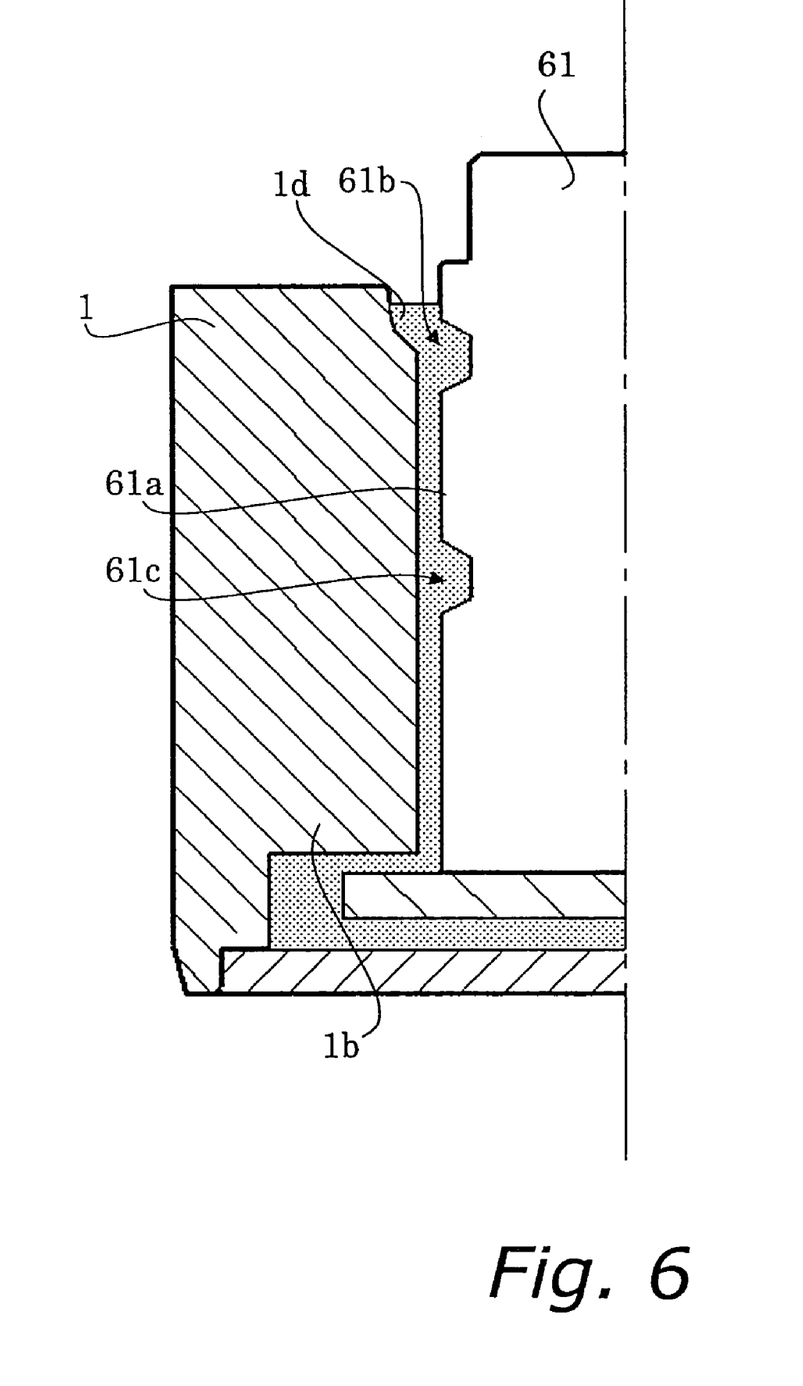
FIG. 6 is a cross section of the structure of the shaft in a modification.

With the shaft 61 shown in FIG. 6, two recesses are formed at two places aligned in the axial direction. More specifically, a recess 61b and a recess 61c are formed at locations corresponding to the recess 21b and the recess 41b, respectively, in the outer peripheral face 61a.

Figure 7:
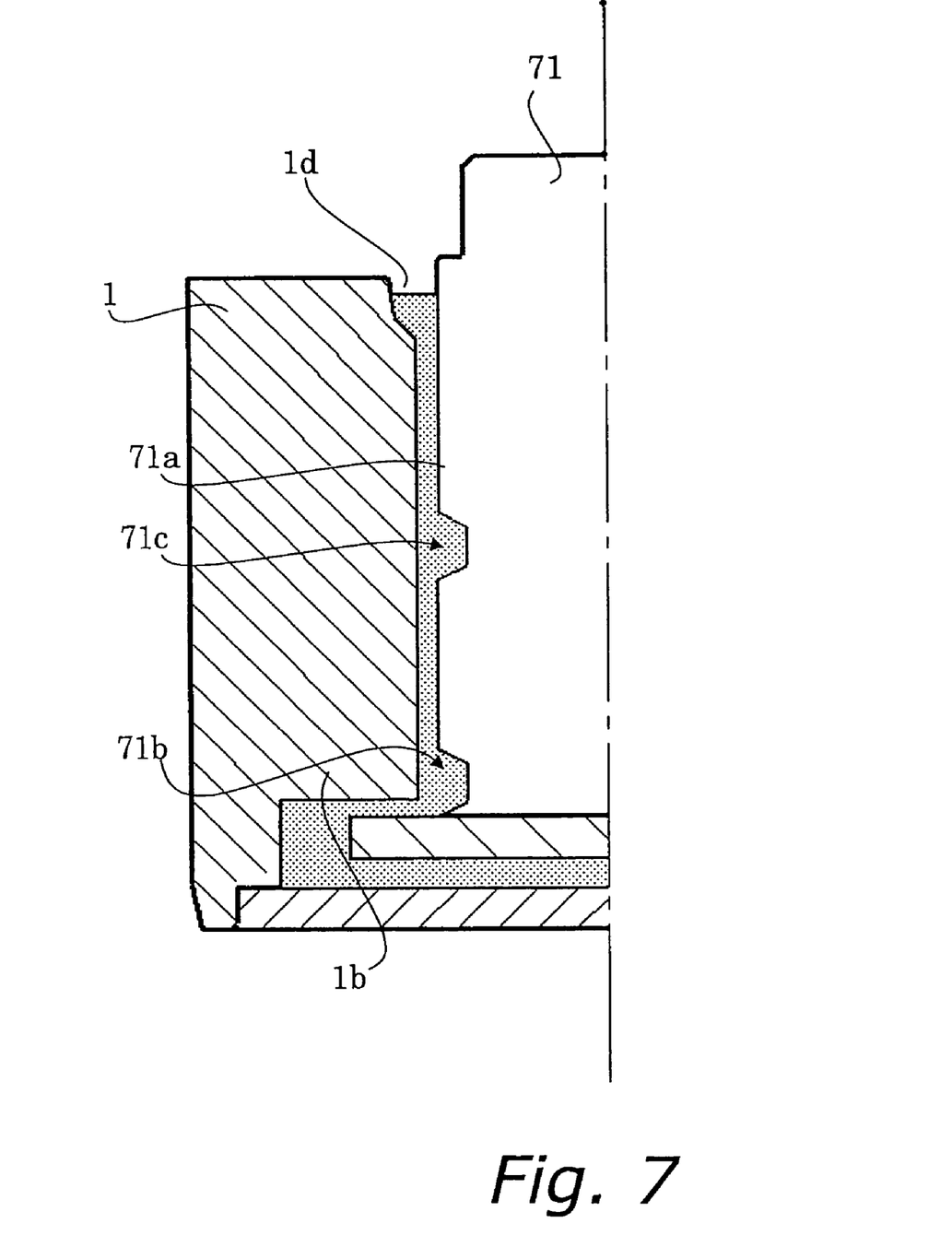
FIG. 7 is a cross section of the structure of the shaft in a modification.

With the shaft 71 shown in FIG. 7, two recesses are formed at two places aligned in the axial direction. More specifically, a recess 71b and a recess 71c are formed at locations corresponding to the recess 31b and the recess 41b, respectively, in the outer peripheral face 71a.

Figure 8:
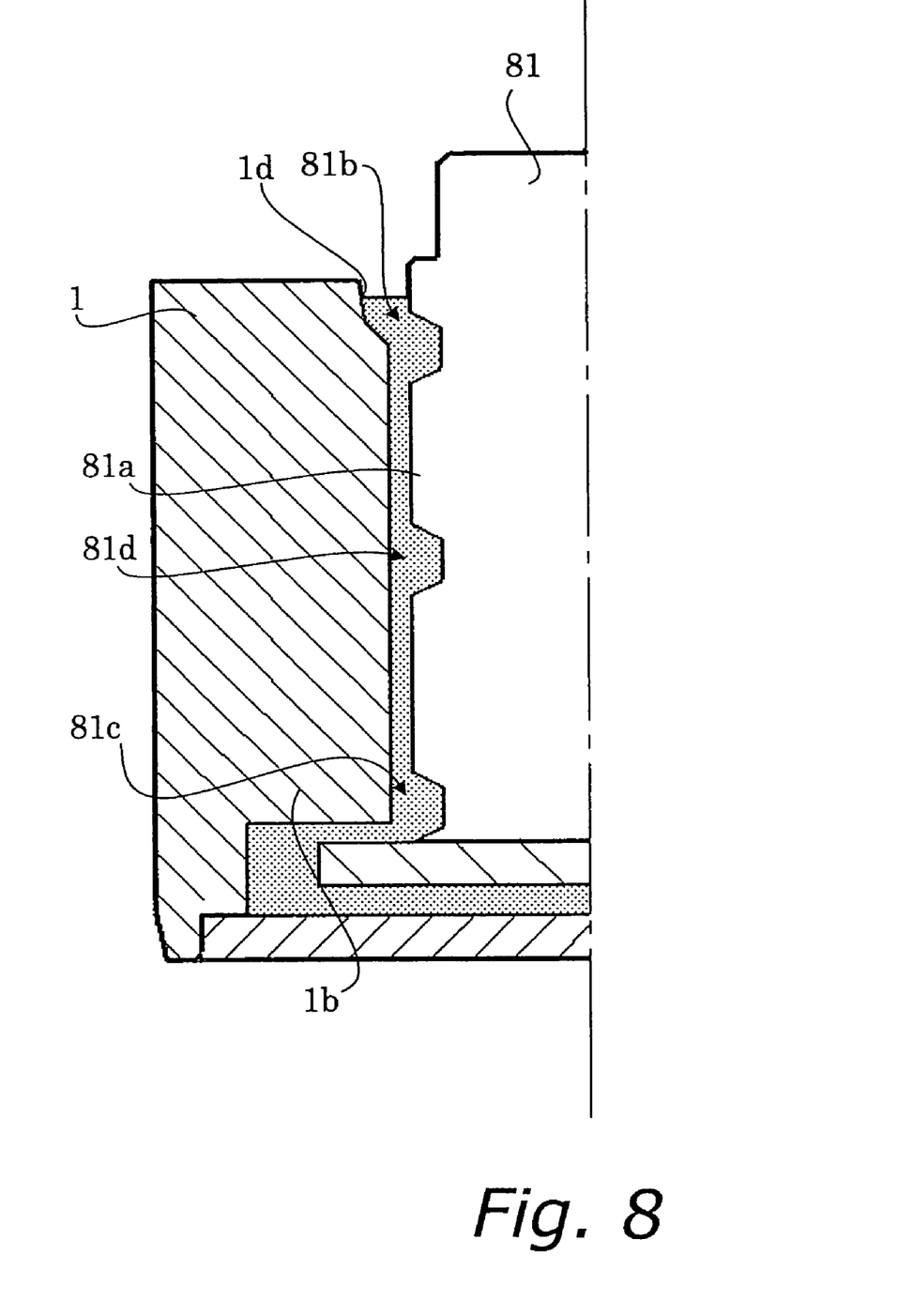
FIG. 8 is a cross section of the structure of the shaft in a modification.

With the shaft 81 shown in FIG. 8, three recesses are formed at three places aligned in the axial direction. More specifically, a recess 81b, a recess 81c, and a recess 81d are formed at locations corresponding to the recess 21b, the recess 31b, and the recess 41b, respectively, in the outer peripheral face 81a.

When each of these shafts is formed from stainless steel or the like, if the recesses are made with a forming tool or the like, the shaft can be manufactured at the same cost as the shaft 2 with no texturing (see FIG. 1a).

With hydrodynamic bearing devices in which these shafts are used, the outer peripheral face other than the recesses becomes the effective portion of the radial dynamic pressure bearing. Accordingly, the effective length of the dynamic pressure generation grooves 9a and 9b formed at opposing locations is set by the axial width of the recesses. The recess shape may also consist of angled faces.

When combined with each of these shafts, the dynamic pressure generation grooves 9a and 9b are formed longer in the axial direction than what is needed for dynamic pressure generation, and the recesses are across from the dynamic pressure generation grooves 9a and 9b in the radial direction, which determines the effective length of the dynamic pressure generation grooves 9a and 9b in the axial direction. Therefore, even if there should be variance in the dimensions of the dynamic pressure generation grooves 9a and 9b, the effective length of the dynamic pressure generation grooves 9a and 9b can be set by the recesses, so there is less dynamic pressure imbalance in the axial direction.

Sleeve Modifications

The sleeve used in the spindle motor is not limited to the one described above, and may instead be the following. The various sleeves discussed below can be used in combination with the various shafts discussed in the section titled "Shaft Modifications."

With the sleeves discussed below, the inner peripheral face extends linearly in the axial direction (forming a plane that is parallel to the rotational axis), and no stepped portion or recess is formed therein. These sleeves are worked by the above-mentioned method involving the use of a metal mold, and have a stepped portion formed on the lower side in the axial direction, and an inner peripheral face extending upward in the axial direction from the stepped portion. Furthermore, the dynamic pressure generation grooves are formed, for example, by rolling in the inner peripheral face.

(1)

FIGS. 9a to 9d show the sleeves 1, 22, 32, and 42 in which herringbone dynamic pressure generation grooves are formed continuously up and down in the axial direction.

Figure 9A:
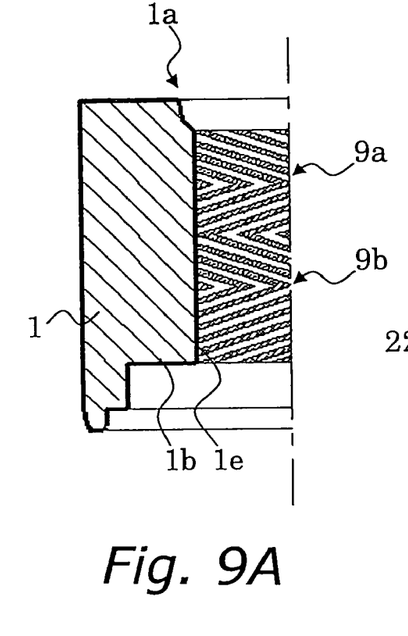
FIG. 9 is a cross section of the structure of the sleeve in a modification.

The sleeve 1 shown in FIG. 9a is the same as that described in Embodiment 1, and will therefore not be described again here.

Figure 9B:
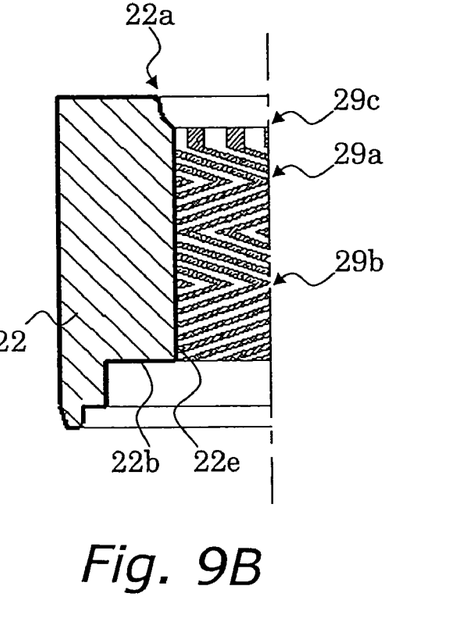

Dynamic pressure generation grooves 29a and 29b, which are formed above and below in the axial direction, and a linear groove 29c, which is formed linearly in the axial direction in the axial outer end of the dynamic pressure generation groove 29a, are formed in the inner peripheral face 22e of the sleeve 22 shown in FIG. 9b. The linear groove 29c and the dynamic pressure generation grooves 29a and 29b are formed continuously in the axial direction, and the linear groove 29c and the dynamic pressure generation groove 20b open to the upper and lower sides, respectively, in the axial direction.

Figure 9C:
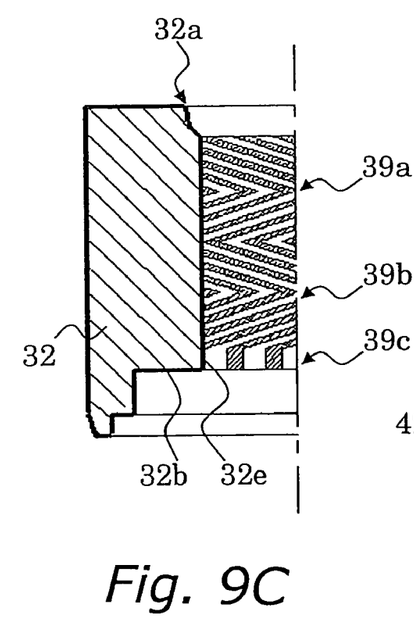

Dynamic pressure generation grooves 39a and 39b, which are formed above and below in the axial direction, and a linear groove 39c, which is formed linearly in the axial direction in the axial outer end of the dynamic pressure generation groove 39b, are formed in the inner peripheral face 32e of the sleeve 32 shown in FIG. 9c. The linear groove 29c and the dynamic pressure generation grooves 29a and 29b are formed continuously in the axial direction, and the linear groove 29c and the dynamic pressure generation groove 20b open to the upper and lower sides, respectively, in the axial direction.

Figure 9D:
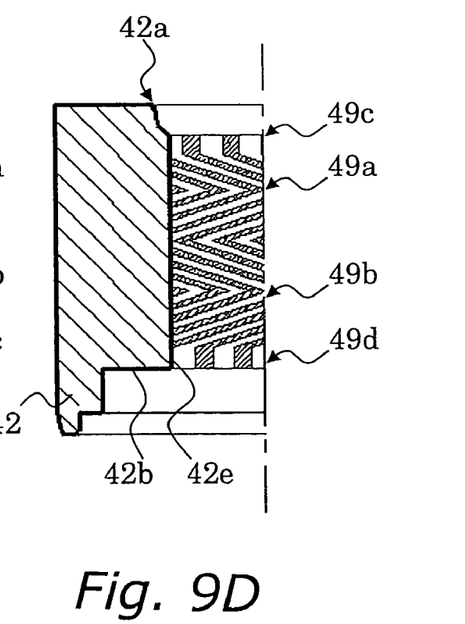

Dynamic pressure generation grooves 49a and 49b, which are formed above and below in the axial direction, and a linear groove 49c, which is formed in the axial outer ends of the dynamic pressure generation grooves 49a and 49b, are formed in the inner peripheral face 42e of the sleeve 42 shown in FIG. 9d. The linear groove 49c, the dynamic pressure generation grooves 49a and 49b, and a linear groove 49c and 49d are formed continuously in the axial direction, and the linear grooves 49c and 49d open to the upper and lower sides, respectively, in the axial direction.

The effective length of the dynamic pressure generation grooves in the axial direction is determined by the combination of the dynamic pressure generation grooves and the recesses formed in each shaft (see FIG. 1a and FIGS. 2 to 8). More specifically, the dynamic pressure generation grooves are formed longer in the axial direction than what is needed for dynamic pressure generation, and the recesses are across from the dynamic pressure generation grooves in the radial direction, which determines the effective length of the dynamic pressure generation grooves in the axial direction. Therefore, even if there should be variance in the dimensions of the dynamic pressure generation grooves, the effective length of the dynamic pressure generation grooves can be set by the recesses, so there is less dynamic pressure imbalance in the axial direction.

No dynamic pressure is generated in the linear groove portions formed at the axial outer ends of the dynamic pressure generation grooves. Providing linear grooves makes it easier to suppress imbalance in the dynamic pressure generation grooves. More specifically, any deviation in the inversion timing or manufacturing error in the sleeve is absorbed by the linear grooves, so there tends to be less axial imbalance in the dynamic pressure if the angled portions of the herringbone grooves are worked for the same amount of time.

When combined with a shaft in which a recess is formed at a location across from the approximate axial center of the angled faces and the stepped portion in the sleeve, as with the shafts shown in FIGS. 4, 6, 7, and 8, the connected portions of the dynamic pressure generation grooves arranged above and below in the axial direction may be disposed so as to be across from this recess.

(2)

FIGS. 10a to 10d show the sleeves 52, 62, 72, and 82, in which are formed a pair of herringbone dynamic pressure generation grooves aligned in the axial direction, and a linear groove formed linearly in the axial direction and connecting these dynamic pressure generation grooves in the axial direction.

Figure 10A:
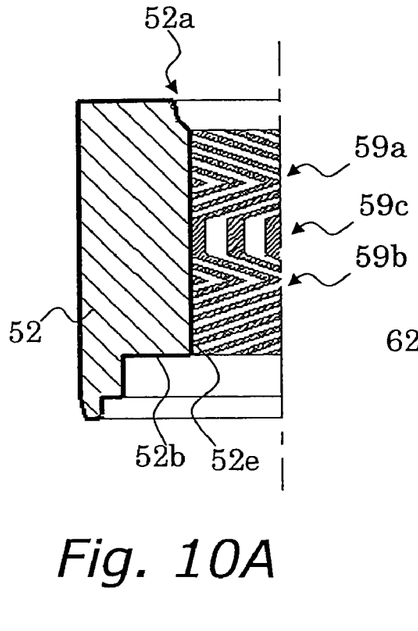
FIG. 10 is a cross section of the structure of the sleeve in a modification.

Dynamic pressure generation grooves 59a and 59b, which are formed above and below in the axial direction, and a linear groove 59c, which is formed continuously on the inside in the axial direction of the dynamic pressure generation grooves 59a and 59b, are formed in the inner peripheral face 52e of the sleeve 52 shown in FIG. 10a. The dynamic pressure generation groove 59a, the linear groove 59c, and the dynamic pressure generation groove 59b are formed continuously in the axial direction, and the dynamic pressure generation grooves 59a and 59b open to the upper and lower sides, respectively, in the axial direction.

Figure 10B:
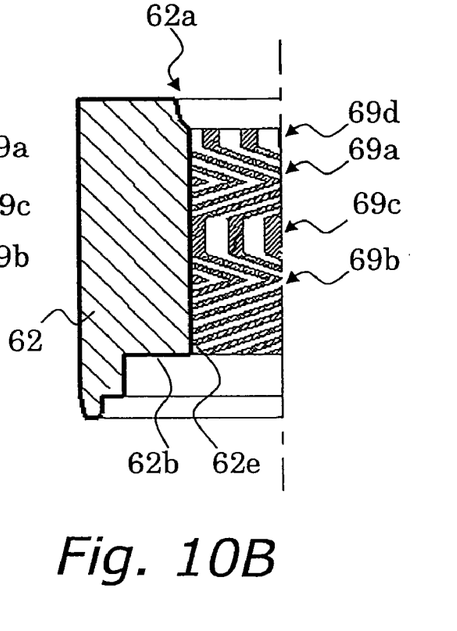

Dynamic pressure generation grooves 69a and 69b, which are formed above and below in the axial direction, a linear groove 69c, which is formed continuously on the inside in the axial direction of the dynamic pressure generation grooves 69a and 69b, and a linear groove 69d, which is formed continuously with the dynamic pressure generation groove 69a on the outside in the axial direction of the dynamic pressure generation groove 69a, are formed in the inner peripheral face 62e of the sleeve 62 shown in FIG. 10b. The linear groove 69d, the dynamic pressure generation groove 69a, the linear groove 69c, and the dynamic pressure generation groove 69b are formed continuously in the axial direction, and the linear groove 69d and the dynamic pressure generation groove 69b open to the upper and lower sides, respectively, in the axial direction.

Figure 10C:
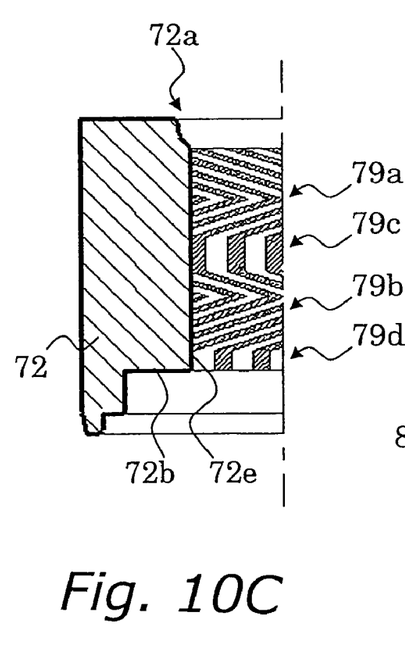

Dynamic pressure generation grooves 79a and 79b, which are formed above and below in the axial direction, a linear groove 79c, which is formed continuously on the inside in the axial direction of the dynamic pressure generation grooves 79a and 79b, and a linear groove 79d, which is formed continuously with the dynamic pressure generation groove 79b on the outside in the axial direction of the dynamic pressure generation groove 79b, are formed in the inner peripheral face 72e of the sleeve 72 shown in FIG. 10c. The dynamic pressure generation groove 79a, the linear groove 79c, the dynamic pressure generation groove 79b, and the linear groove 79d are formed continuously in the axial direction, and the dynamic pressure generation groove 79a and the linear groove 79d open to the upper and lower sides, respectively, in the axial direction.

Figure 10D:
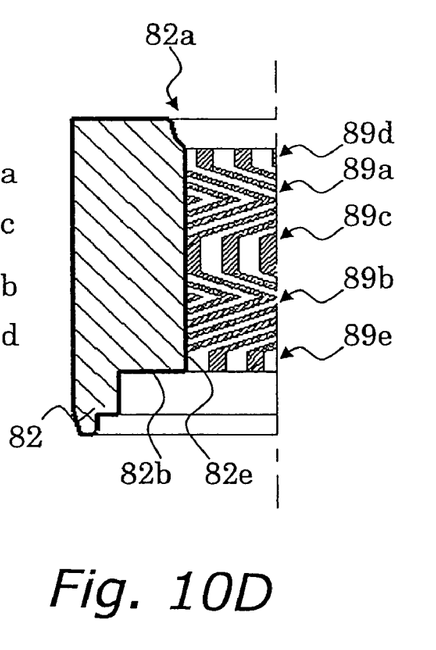

Dynamic pressure generation grooves 89a and 89b, which are formed above and below in the axial direction, a linear groove 89c, which is formed continuously on the inside in the axial direction of the dynamic pressure generation grooves 89a and 89b, a linear groove 89d, which is formed continuously with the dynamic pressure generation groove 89a on the outside in the axial direction of the dynamic pressure generation groove 89a, and a linear groove 89e formed continuously with the dynamic pressure generation groove 89b on the outside in the axial direction of the dynamic pressure generation groove 89b are formed in the inner peripheral face 82e of the sleeve 82 shown in FIG. 10d. The linear groove 89d, the dynamic pressure generation groove 89a, the linear groove 89c, the dynamic pressure generation groove 89b, and the linear groove 89e are formed continuously in the axial direction, and the linear grooves 89d and 89e open to the upper and lower sides, respectively, in the axial direction.

The effective length of the dynamic pressure generation grooves in the axial direction is determined by the combination of the dynamic pressure generation grooves and the recesses formed in each shaft (see FIG.1a and FIGS. 2 to 8). More specifically, the dynamic pressure generation grooves are formed longer in the axial direction than what is needed for dynamic pressure generation, and the recesses are across from the dynamic pressure generation grooves in the radial direction, which determines the effective length of the dynamic pressure generation grooves in the axial direction. Therefore, even if there should be variance in the dimensions of the dynamic pressure generation grooves, the effective length of the dynamic pressure generation grooves can be set by the recesses, so there is less dynamic pressure imbalance in the axial direction.

No dynamic pressure is generated in the linear groove portions formed on the inside in the axial direction of the dynamic pressure generation grooves. Providing these linear grooves makes it easier to suppress imbalance in the dynamic pressure generation grooves. More specifically, any deviation in the inversion timing or manufacturing error in the sleeve is absorbed by the linear grooves, so there tends to be less axial imbalance in the dynamic pressure if the angled portions of the herringbone grooves are worked for the same amount of time.

When combined with a shaft in which a recess is formed at a location across from the approximate axial center of the angled faces and the stepped portion in the sleeve, as with the shafts shown in FIGS. 4, 6, 7, and 8, the linear grooves connecting the dynamic pressure generation grooves arranged above and below in the axial direction may be disposed so as to be across from this recess.

Spindle Motor Modifications

The shaft and sleeve structures discussed above can be applied to spindle motors other than that shown in FIG. 1a. For instance, the shaft may be a flangeless type, which has no flange.

Figure 11A:
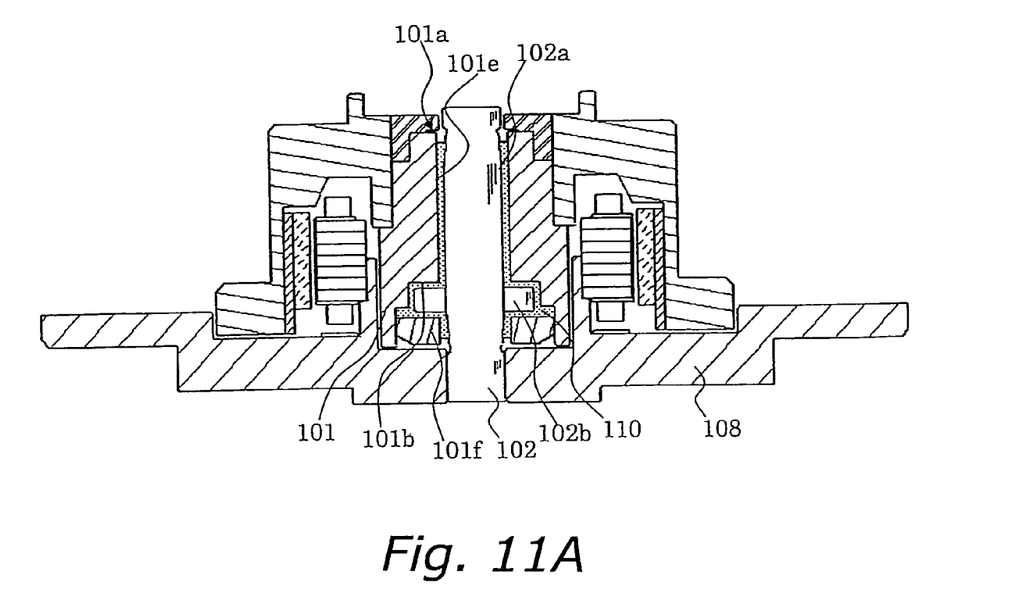
FIG. 11a is a simplified vertical cross section of a spindle motor featuring a hydrodynamic bearing device pertaining to a modification.

Also, in Embodiment 1 the description was of a spindle motor equipped with a hydrodynamic bearing device in which the shaft was the rotating side, but as shown in FIG. 11a, the above-mentioned shaft and sleeve structures can also be applied to a hydrodynamic bearing device in which the shaft is the fixed side.

The spindle motor shown in FIG. 11a is equipped with a hydrodynamic bearing device having a shaft 102 fixed to a base 108, a sleeve 101 inserted so as to be capable of relative rotation with respect to the shaft 102, and a lubricant 110 that fills the space between the shaft 102 and the sleeve 101.

With the sleeve 101, a stepped portion 101b and an inner peripheral face 101e extending linearly in the axial direction and continuously to the stepped portion 101b are formed by a working method involving the use of a metal mold.

The shaft 102 is equipped with a thrust flange 102b across from the stepped portion 101b in the axial direction and near the end on the base side. One end face of the thrust flange 102b in the axial direction constitutes a thrust bearing component between itself and an annular thrust plate 101f fixed by press fitting or the like to the base-side end of the sleeve 101, or the axial face of the stepped portion 101b across from this end face in the axial direction.

The outer peripheral face 102a that is farther to the outside in the axial direction than the thrust flange 102b of the shaft 102 is worked into any of the shapes shown in FIG. 1a and FIGS. 2 to 8.

Figure 11B:
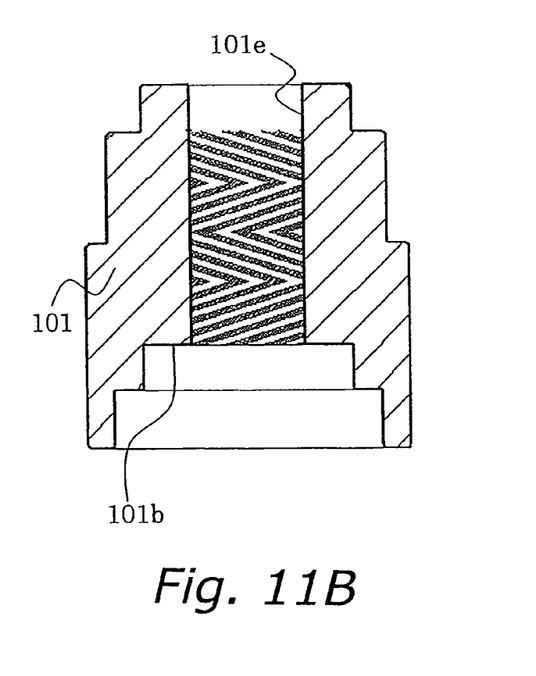
FIG. 11b is a cross section of the sleeve used in the hydrodynamic bearing device.

A dynamic pressure generation groove is formed in the inner peripheral face 101e of the sleeve 101 as shown in FIG. 11b. The dynamic pressure generation groove formed in the inner peripheral face 101e of the sleeve 101 is not limited to the shape shown in FIG. 1b, and may instead be any of the shapes shown in FIGS. 9 and 10.

A spindle motor constituted as above has the same effects as the spindle motor of Embodiment 1. More specifically, the inner peripheral face 101e of the sleeve 101 extends linearly in the axial direction, and no recess or other such stepped portion is formed. Therefore, the sleeve 101 can be easily manufactured with a metal mold or the like, so the cost is lower.

It is also possible to form the dynamic pressure generation grooves by rolling. This means that working is simpler.

Other Embodiments

The above embodiments were given for the sake of illustration as examples of the present invention, and do not limit the present invention. To the extent that they are not contrary to the gist of the present invention, various modifications are possible.

INDUSTRIAL APPLICABILITY

The present invention is applied to hydrodynamic bearing devices, and to various rotational structures in which this is applied, such as spindle motors.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A hydrodynamic bearing device comprising:
   a sleeve having an inner peripheral face extending linearly in the axially direction of the sleeve, and hydrodynamic grooves formed in the inner peripheral face of the sleeve;
   a shaft inserted in the sleeve so as to be capable of rotation relative to the inner peripheral face of the sleeve, the shaft having an outer peripheral face formed with an annular recess provided in an axially middle portion of the shaft and opposing the inner peripheral face of the sleeve, thereby defining an axially effective length of the hydrodynamic grooves; and
   a lubricant provided in a space between the inner peripheral face of the sleeve and the outer peripheral face of the shaft,
   said hydrodynamic grooves including plural V-shaped grooves, the V-shaped grooves being arranged continuously in the axial direction such that each linear portion of the V-shaped grooves extends at a predetermined angle relative to the axial direction, and
   said annular recess being located so as to oppose part of the V-shaped grooves.

2. The hydrodynamic bearing device according to claim 1, wherein the hydrodynamic grooves are herringbone grooves arranged in the circumferential direction.

3. The hydrodynamic bearing device according to claim 1, wherein a second annular recess is formed in the outer peripheral surface of the shaft, the second annular recess being formed at one end portion of the shaft.

4. The hydrodynamic bearing device according to claim 3, wherein a third annular recess is formed in the outer peripheral surface of the shaft, the third annular recess being formed at the other end portion of the shaft.

5. A spindle motor comprising a hydrodynamic bearing device according to claim 1.

* * * * *